Patented Nov. 26, 1935

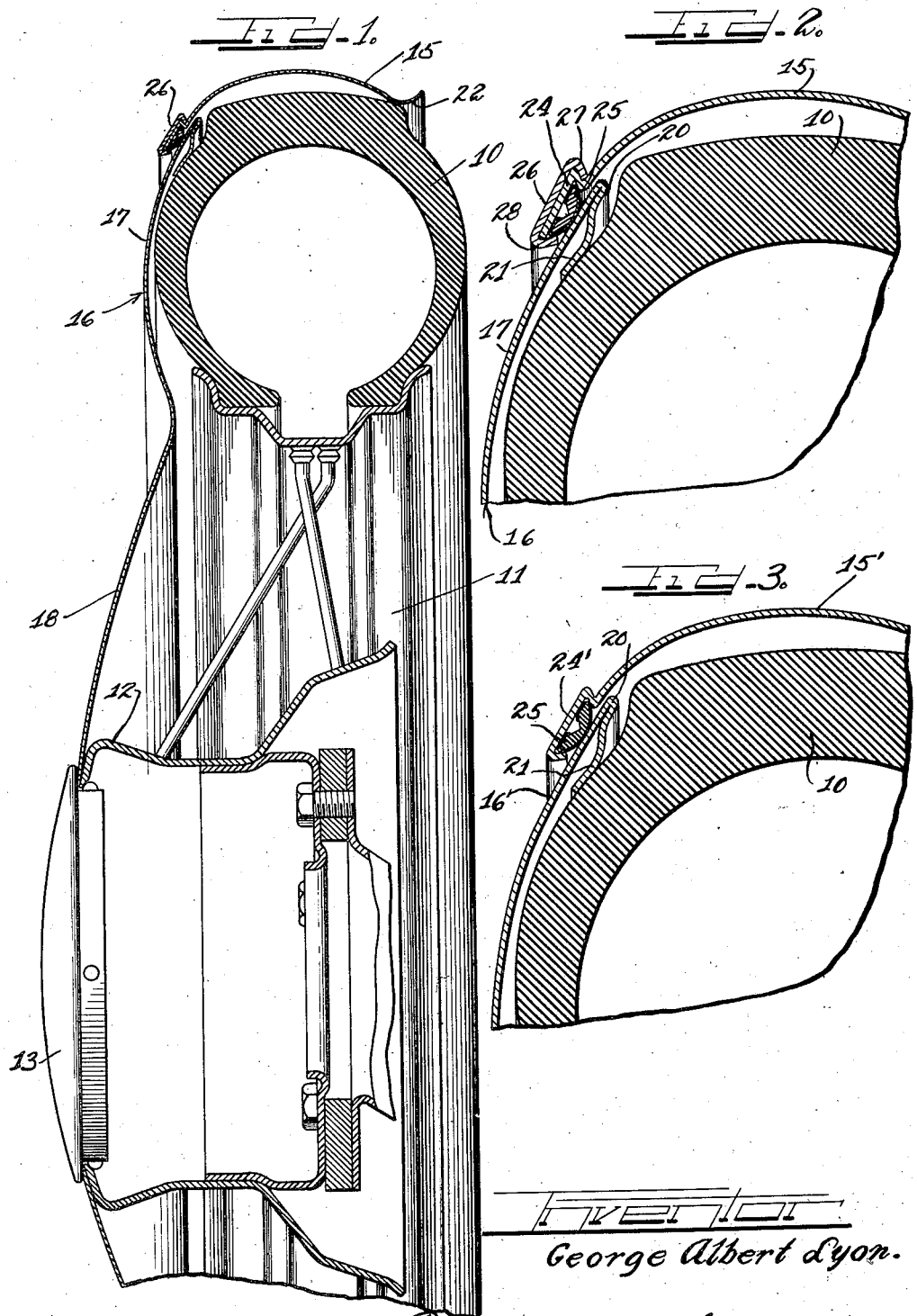

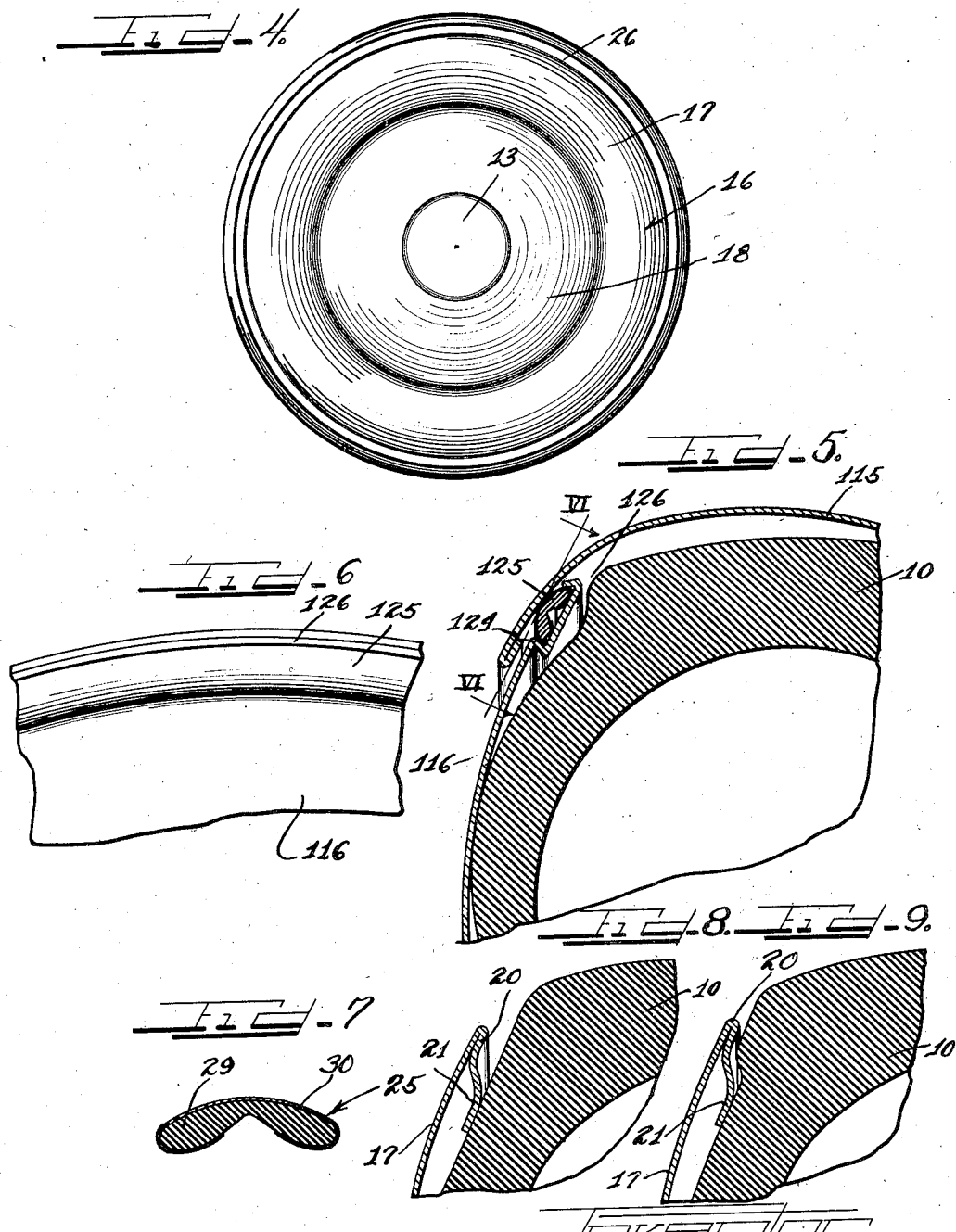

2,022,130

UNITED STATES PATENT OFFICE 2,022,130

SPARE TIRE COVER

George Albert Lyon, Detroit, Mich., assignor to Lyon Incorporated, Detroit, Mich., a corporation of Delaware Application August 21, 1933, Serial No. 686,029

11 Claims. (Cl. 150—54)

This invention relates to a spare tire cover and more particularly to a tire cover construction of the type disclosed in my issued Letters Patent No. 1,807,697, dated June 2, 1931.

An object of this invention is to provide an improved beaded construction for use in tire covers, and more specifically to provide a cushioning bead construction for use in tire covers of the type disclosed in my aforesaid letters patent.

Another object of this invention is to provide an improved way of securing a bead or a cushioning member to a member such as a part of a tire cover.

In accordance with the general features of this invention, I have provided a tire cover member having a laterally offset edge portion on one side of which there is provided a cushioning bead and having a bead retaining structure of U-shaped cross-section between the legs of which the bead is disposed.

In accordance with other features of this invention I have provided a tire cover side member having its outermost margin turned back upon itself and then laterally offset for contact with the side wall of a spare tire.

Other objects and features of this invention will more fully appear from the following detailed description taken in connection with the accompanying drawings which illustrate several embodiments thereof and in which—

Figure 1 is a fragmentary sectional view partly in elevation taken through a spare tire and wheel to which my novel cover is applied.

Figure 2 is an enlarged fragmentary sectional view similar to a portion of Figure 1.

Figure 3 is an enlarged fragmentary sectional view similar to Figure 2 and showing a modification of the invention.

Figure 4 is a side view of the construction shown in Figure 1.

Figure 5 is an enlarged fragmentary sectional view similar to Figures 2 and 3 and showing a still further modification of the invention.

Figure 6 is a fragmentary side detail view taken on the line VI—VI of Figure 5 looking in the direction indicated by the arrows.

Figure 7 is an enlarged sectional view taken through the cushioning bead employed in the various embodiments of my invention.

Figure 8 is a fragmentary sectional view showing how the side disc illustrated in Figure 1 cooperates with one type of tire.

Figure 9 is a view similar to Figure 8 showing how the side disc cooperates with another type of tire.

The reference character 10 designates generally a spare tire which is disposed on a conventional spare wheel 11 having a central hub 12 into which is snapped a conventional hub cap 13. This spare wheel and tire construction may be supported in any suitable or conventional way upon an automotive vehicle.

The tire cover of my construction is illustrated as being of the type disclosed in my Letters Patent No. 1,807,967, but it is of course to be understood that the invention is not to be limited to that form of cover but only insofar as defined by the scope and spirit of the appended claims.

The cover as shown comprises a split band, rim or tread covering part 15 adapted to be resiliently sprung over the tread of the tire 10 and into retaining cooperation with a side member or disc 16 positioned over the outer side of the spare wheel and tire. Each of these parts 15 and 16 may be made from any suitable sheet material such for example as metallic sheet and each is of a curved cross-sectional shape so as to conform generally with the outer contour of the spare tire 10.

The side disc 16 includes an annular convex portion 17 for disposition over the outer side of the spare tire and a centrally bulged portion 18 disposed between the tire and the wheel hub 12. This portion 18 is provided with a central opening of a size commensurate with that of the wheel hub 12 so as to accommodate the hub cap 13. This hub cap as will be observed from Figure 1 engages the innermost edge of the side portion 18 and is clamped to the hub 12. The outermost extremity of the side disc 16 is turned backwardly upon itself, as indicated at 20, and is then bent into a laterally offset portion 21 (Figure 2) which is adapted to yieldably engage the side wall of the tire 10. It follows that when the split tread covering part 15 is in position on the tire in retaining cooperation with the side disc 16, it presses against the outermost part of the disc 16 to press the lateral offset portion 21 into yieldable cooperation with the spare tire 10. In Figures 7 and 8 I have illustrated how the offset portion 21 is adapted to cooperate with two different types of tires. This structure is advantageous in that it enables a cover of given size to better accommodate itself to variations in different makes of tires of that size.

Also, the rear edge portion of the split rim 15 is curved as indicated at 22 in Figure 1 and is adapted to yieldably engage the rear of the tire tread or in other words to the rear of the median plane of the tire. This arrangement enables the cover to have a double line contact with the spare tire, one at the front side of the tire and one at the rear side of the tire.

The tread covering part 15 has its front edge formed into a laterally offset portion 24 on one side of which is disposed a cushioning bead strip 25 and on the other side of which is disposed a retaining strip 26.

The retaining strip 26 is of a channeled or U-shaped cross-section and has one of its slanting legs 27 engaging over a correspondingly slanted part of the offset portion 24. The other slanting leg 28 of the channeled strip 26 is engaged over the free edge of the offset portion 24 and is in contact with the bead 25.

The beading strip 25 may be made of any suitable material, but as best shown in Figure 7, is preferably made of a rubber filler 29 covered with fabric 30. This strip as best shown in Figure 7 is of a bulged construction and is adapted to have its margin depressed toward each other so that the bead may be progressively pressed or snapped into position between the leg 28 of the retaining strip 26 and the offset portion 24 of the cover rim 15.

In the manufacture of the cover rim 15, it may be provided with the offset portion 24 prior to the finishing of the rim. Then the rim may be finished before the cushioning bead 25 is applied thereto.

Thereafter the retaining strip 26 which may have its external surface chromium plated or nickeled, is engaged over the offset portion 24 and its leg 28 is bent over the free edge of the offset portion.

Subsequent to this operation, the rubber beading strip may be flexed as previously noted and inserted in the pocket provided between the offset portion 24 and the leg 28 of the retaining strip 26.

In Figure 3, I have illustrated a modification of the invention in which the cover rim 15' is provided with the cushioning means of a somewhat simpler form. The cushioning bead construction in this form of the invention embodies an offset channeled portion 24' formed integral with the rim 15'. This portion has two inturned sides or legs between which is disposed a cushioning bead strip 25 which is identical to the bead illustrated in Figure 7. Inasmuch as this bead is applied to the outer edge of the offset portion 24' in much the same way as the bead 25 is applied to the outer edge of the split rim 15 in the first form of the invention, it is thought that no further description of this modification is necessary.

In Figures 5 and 6 I have illustrated a still further modification of the invention in which the beading construction is disposed wholly under the split rim 115 so as not to be visible when the cover is in position on the tire. Also in this form of the invention the cushioning bead strip 125 faces outwardly instead of inwardly as in the forms of the invention shown in Figures 2 and 3. This cushioning strip is held in place on the offset portion 124 of the side disc 116 by means of the side legs of portion 124.

Since, with the exceptions noted above, this form of beading construction is otherwise like the previously described form shown in Figure 3, it is thought that no further description of the same is necessary.

Now I desire it understood that while I have illustrated and described in detail several embodiments of this invention, the invention is not to be thus limited but only insofar as defined by the scope and spirit of the appended claims.

I claim as my invention:

1. In a tire cover, a member having a laterally offset edge portion, a bead disposed over one side of said edge portion, and a retaining strip of U-shaped cross-section disposed over the opposite side of said edge portion with one of its legs engaging the outermost extremity of said edge portion and with its other leg engaged over an inner extremity of said edge portion where it is offset from the cover member.

2. In a tire cover, a member having a laterally offset edge portion, a bead disposed over one side of said edge portion, and a retaining strip of U-shaped cross-section disposed over the opposite side of said edge portion with one of its legs engaging the outermost extremity of said edge portion and with its other leg engaged over an inner extremity of said edge portion where it is offset from the cover member, said strip constituting the sole means for retaining said bead in position on said offset portion.

3. In a tire cover, a member having a laterally offset edge portion, a bead disposed over one side of said edge portion, and a retaining strip of U-shaped cross-section disposed over the opposite side of said edge portion with one of its legs engaging the outermost extremity of said edge portion and with its other leg engaged over an inner extremity of said edge portion where it is offset from the cover member, said bead comprising a strip of cushioning material adapted to serve as an anti-rattle means in the cover.

4. In a tire cover, a member having a laterally offset edge portion, a bead disposed over one side of said edge portion, and a retaining strip of U-shaped cross-section disposed over the opposite side of said edge portion with one of its legs engaging the outermost extremity of said edge portion and with its other leg engaged over an inner extremity of said edge portion where it is offset from the cover member, said bead comprising a strip of cushioning material adapted to serve as an anti-rattle means in the cover and being medially bulged to contact with the cover part.

5. In a multi-part tire cover, a cushioning bead between the parts of the cover and secured to one of them, and means for retaining said bead on the corresponding cover part comprising a single channel strip pressed into position on said cover part and over a part of said bead.

6. In a multi-part tire cover, a cushioning bead between the parts of the cover and secured to one of them, and means for retaining said bead on the corresponding cover part comprising a single channel strip pressed into position on said cover part and over a part of said bead, said cushioning bead being on one side of the cover part to which it is secured and said retaining means being disposed on the opposite side of the same cover part.

7. In a multi-part tire cover, a side member for disposition over an outer side of the wall of the spare tire, and having its outermost margin provided with an inturned yieldable strip portion offset laterally away from the side member to contact the outer side of a spare tire between the side member and the tire and to accommodate slight variations in the size and contour of the tire and separate tire covering means for pressing said inturned portion against the tire.

8. In a multi-part tire cover, a cushioning bead between the parts of the cover and secured to one of them, and means for retaining said bead on the corresponding cover part comprising a single channel strip pressed into position on said cover part and over a part of said bead, said cushioning bead being disposed wholly between the cover parts and provision being made to accommodate such bead by the lateral offsetting of the cover part carrying the bead.

9. In a spare tire cover, a side part for disposition over substantially only an outer side wall of a spare tire and having a yieldable portion offset inwardly and laterally away from the part proper to contact the outer side wall of the tire and to accommodate slight variations in the size and contour of the tire and separate tire covering means for pressing said offset portion against the tire.

10. In a spare tire cover, a metallic side part for disposition over an outer side wall of the tire and having a marginal portion turned back upon itself with its extremity offset inwardly and laterally away from the part proper to contact the outer side wall of the tire and separate tire covering means for pressing said turned portion against the tire.

11. In a spare tire cover, a part having a portion offset and provided with converging sides to provide a channel therebetween and a cushioning molding strip in said channel with its margins under said sides, said offset portion including an ornamental strip of substantially U-shaped cross-section with one of its side edges or legs defining one side of said channel and in strip retaining engagement with a marginal edge of said molding strip.

GEORGE ALBERT LYON.